United States Patent [19]

Ropp

[11] Patent Number: 4,634,540

[45] Date of Patent: Jan. 6, 1987

[54] COMPOSITION AND METHOD FOR MODIFYING AND AUGMENTING RECOVERY OF HYDROCARBONS FROM HYDROCARBON-BEARING FORMATIONS

[76] Inventor: Richard C. Ropp, 138 Mountain Ave., Warren, N.J. 07060

[21] Appl. No.: 553,885

[22] Filed: Nov. 22, 1983
(Under 37 CFR 1.47)

Related U.S. Application Data

[63] Continuation-in-part of Ser. No. 220,062, Jan. 26, 1981, abandoned.

[51] Int. Cl.$^4$ ............................................. E21B 43/22
[52] U.S. Cl. ............................... 252/8.551; 166/270; 208/143; 252/8.554
[58] Field of Search ................. 252/8.55 R, 8.55 D, 252/313 S; 166/270, 303; 208/143, 145

[56] References Cited

U.S. PATENT DOCUMENTS

| | | | |
|---|---|---|---|
| 1,178,205 | 4/1916 | Baillio | 423/332 |
| 1,651,311 | 11/1927 | Atkinson | 252/855 X |
| 2,614,994 | 10/1952 | Balthis | 252/313.1 |
| 2,614,995 | 10/1952 | Balthis | 252/313.2 |
| 2,857,002 | 10/1958 | Pevere et al. | 166/303 |
| 3,102,588 | 9/1963 | Fisher | 166/261 |
| 3,208,514 | 9/1965 | Dew et al. | 166/261 |
| 4,007,791 | 2/1977 | Johnson | 166/303 X |
| 4,141,416 | 2/1979 | Holm | 166/270 |

*Primary Examiner*—Herbert B. Guynn
*Attorney, Agent, or Firm*—David A. Jackson

[57] ABSTRACT

A process and composition for modifying hydrocarbons and/or recovering hydrocarbons from hydrocarbon-bearing formations involving mixing controlled quantities of alkali metal hydroxide and silicon in an aqueous medium to produce an oil modification agent. When recovering hydrocarbons, the composition can be injected into a hydrocarbon-bearing formation to react with and/or thin the entrapped hydrocarbons within the formation. The composition also provides a dispersing agent which aids in release of the hydrocarbon from its entrappment and enhances recovery from the formation.

35 Claims, No Drawings

COMPOSITION AND METHOD FOR MODIFYING AND AUGMENTING RECOVERY OF HYDROCARBONS FROM HYDROCARBON-BEARING FORMATIONS

CROSS-REFERENCE TO RELATED APPLICATION

This is a continuation-in-part of application Ser. No. 220,062, filed Jan. 26, 1981, now abandoned.

BACKGROUND OF THE INVENTION

There are large reserves of crude oil which cannot or have not been recovered. Most of these reserves are found in geological formations which are considered to be depleted. Of the 442 billion barrels of oil discovered to date at various locations in the United States, less than 30% of that oil has actually been recovered and 70% remains in place. Removal of the 30% of the oil has been accomplished through the use of primary, secondary and tertiary recovery techniques.

Primary oil recovery techniques have depended upon the internal pressure that exists in the oil bearing formation which is called "bottom hole pressure". When a well is drilled from the surface, the internal pressure pushes the oil to the surface or to the well bore so that it can be recovered. After the pressure is exhausted, secondary recovery techniques have been employed. In general, such secondary techniques involve pumping water or sometimes gas into a reservoir so that the oil is swept toward the well where it can be pumped to the surface. Such techniques have boosted a reservoir's average yield to about 25-30% but the remaining 70% has been extremely difficult to release because usually the oil is either too heavy to be driven to the well by the water or gas, or is too diffused, or is trapped by rock and sand.

Removal of some of this remaining 70% can be accomplished through tertiary recovery techniques. Such techniques have not been wholly successful or acceptable, principally due to the cost of conducting the operations. The most advanced of the tertiary recovery techniques involves heating the rock formation sufficiently high to thin the oil and allow it to flow to the well bore. One such method involves the injection of high-temperature, high-pressure steam into the reservoir while an alternative method involves the ignition of the oil bearing rock to push hot gases ahead of the fire thereby causing the oil to thin and flow. With such techniques, oxygen or compressed air must be pumped underground to maintain the combustion process. Although successful, these methods raise the cost of the oil so produced so as to render the technique unacceptable.

Another tertiary recovery technique involves flooding the well with solvents which are miscible with the oil in the formation. Solvents such as kerosene or dry-cleaning agents are pumped into the reservoir so that they mix with and dissolve the oil to clean it from the rock. The high cost of the solvents places one limitation upon the process while another is that the solvents are not recoverable from the rock formations. Carbon dioxide gas has also been injected into the reservoir under pressure. The carbon dioxide dissolves in the oil and reduces the viscosity by a factor of 10 or more thereby causing the oil to flow. While the technique is practical in the laboratory, it has been less so in the field and it also requires the utilization of valuable carbon dioxide gas for the procedure. The most commonly used tertiary recovering techniques involves the injection of a slug of a micellar fluid containing soaps, surfactants, alcohol, oil and water into the rock. The micellar fluid washes some of the oil from the rock and a gel-like thickening agent is then introduced behind the slug to keep the oil moving toward the well. Because surfactants are expensive and because it takes about one year or more to produce oil after the slug has been injected (during which time the well must be sealed to maintain pressure) this technique has not been wholly acceptable either.

SUMMARY OF THE INVENTION

According to the present invention, I have discovered a unique two-phase inorganic composition formed of a dispersant and an oil modification agent which chemically modifies crude oil by contact therewith. Such contact modification causes a breakdown of certain oil components to form low boiling fractions and gases, production of which may change the viscosity of the oil as well. When used for oil recovery, the composition tends to move the oil toward a collection point by the generation of bottom hole pressure together with changes in the viscosity of the oil. When used for aboveground modification of oil, it also causes a similar breakdown to form low boiling fractions and gases.

I have found that a composition of matter which may be prepared outside of the well and which is suitable for oil recovery comprises the reaction product resulting from admixing an alkali metal hydroxide (especially sodium, potassium and/or lithium hydroxide) and silicon, the alkali metal hydroxide being maintained in a molarity between about 0.025 to 10 molar aqueous solution per mole of silicon. The silicon reacts with the hydroxyl ions in the aqueous medium to produce hydrogen together with a water soluble inorganic silicate having unique penetrating and dispersing properties. The two-phase product is the corresponding soluble silicate plus particles of the silicon suspended in the basic aqueous medium. The pH of the solution is maintained greater than about 9 immediately prior to usage. When the corresponding silicate is formed, the composition is diluted in water and then pumped into the oil bearing rock formation. With rock formations having high permeability and porosity, the solution concentration can be reduced while if the rock formation has low permeability and porosity, I have found that it is better to use more concentrated compositions. The composition has surfactant properties and aids in the release of the crude oil from the interstices of the rock formation. It also causes a chemical change in the components of the crude oil by supplying hydrogen for the modification of the oil. It further causes the formation of low boiling fractions and gases which aid in oil release while the silicate aids to lower the viscosity of the oil as well. I believe that the silicon particle surface which is produced by this process has high chemical catalytic activity for modifying the oil. Hydrogen gas, atoms, and/or ions are present at the surface of the silicon particles, caused by an exchange of electrons between the surface of the silicon particles and the reacting hydroxyl ions. The formation of this complex, $Si(OH)_y$, allows an exchange of hydrogen atoms and electrons between the silicon particle surface and the trapped oil to hydrogenate certain oil components to produce gaseous products and to thin the oil. The soluble silicate thereby produced has a definite effect on oil viscosity as well as affecting the direction of modification of certain oil components.

In some situations it may be advantageous to include hydrogenation catalysts such as iron, cobalt, nickel, copper, molybdenum, tungsten, zinc, tin, aluminum, titanium, chromium, manganese, paladium or platinum in catalytic proportions per se, or as the soluble salt used as a homogenous catalyst in solution. Whether these catalysts are added or not, the reaction product provides hydrogen gas together with the silicate that has surface active properties plus particles of the silicon suspended in the basic aqueous medium.

As mentioned above, my composition forms two agents that serve two purposes: the penetrating or dispersing agent carries the oil modification agent into the rock formation whereby the oil modification agent reacts with the oil to change it and produce hydrocarbon gases and the gas pressure that is developed then moves a mass of crude oil out of the pores to a collection point. By these steps my composition moves into the interior of the well and causes the treating fluid to react with the crude oil contained therein to lower the viscosity and/or create gases at the point of interaction and move the crude oil to the collection point.

Concerning the chemical reaction used for preparation, when three moles of sodium hydroxide are mixed with one mole of silicon, $NaHSiO_3$ is produced together with hydrogen. The $NaHSiO_3$ is not stable under these reaction conditions and immediately polymerizes to form another product which can be described as $Na_x(SiO_3)_x + x/2 H_2$ where each x is between about 1 and 8, and depends upon the preparation conditions. The oil modification agent is negatively charged silicon particle surfaces in a basic medium $(Si + yOH^- \rightarrow Si^-(OH)_y)$. The negatively charged hydroxyl ion transfers its charge to the semi-conducting silicon surface of the particle and attaches itself thereto. When two or more hydroxyl ions are attached to the silicon surface, hydrogen gas is produced by the interaction with a silicate ion according to the formula:

$$Si(OH)_y \rightarrow ySiO_3^= + y/2 H_2$$

Quite importantly, it is to be noted that the silicon particles react in the basic medium and become smaller thereby aiding their migration into smaller and smaller rock pores until they disappear. The byproduct of the reaction is the dispersant silicate which also aids in the migration of the oil modification agent into the pores to dislodge the crude oil that is contained therein. Interestingly, I have found that the alkali silicate formed is unique in chemical character and possesses different properties than commercially available alkali silicates in that it has enhanced penetration properties and modifies the viscosity of the oil.

When treating crude oils with the composition according to the present invention, it is important to note that crude oil frequently contains as many as 400 different molecular components. Many of these are straight or branched-chain saturated hydrocarbons and some may contain double bonds within the chain. Other components are napthenes or ring compounds that include oxygen and/or nitrogen in the ring and others may be aromatic rings which may contain oxygen, nitrogen or even sulfur in the ring. I believe the silicon surface acts as a catalytic reducing surface because it supplies hydrogen and electrons at the surface to cause hydrogenation of those compounds which are capable of being hydrogenated. Because of the wide variety of molecular components in the crude oil, it is easy to see that the reduction catalysis between the components of the crude oil and the oil modification agent is quite complex. Certain of the reactions will cause a breakdown to produce hydrocarbon gases within the oil bearing formation.

DESCRIPTION OF THE PREFERRED EMBODIMENTS

A general reaction between crude oil components and the oil modification agent of the present invention may be described as follows:

$$C_nH_{2n} + Si + 3OH^- \rightarrow CH_4 = C_{n-1}H_{2n-2} + HSiO_3^-$$

In the reaction described above it is to be noted that two hydrogen atoms are supplied plus two negative charges for the formation of the methane gas. When the $Si^-(OH)_y$ complex (the interaction product of $OH^-$ and Si) reacts with certain components of the crude oil, it supplies hydrogen to modify the oil composition thereby producing certain gases (in the above reaction only methane is shown for simplicity but other hydrocarbon gases may be produced even up to hexanes) in situ, to produce pressure to move the oil to a collection point. While reacting with the crude oil, the dispersant that is produced during the oil modification process also serves to penetrate the oil bearing strata to help lower oil viscosity so that the oil is dislodged from the pores of the rock more easily.

I have found that the preferred way to prepare the composition of the present invention is to add dry alkali metal hydroxide pellets to powdered or lump silicon. Water added to the mixture initiates the reaction. In the first stage, the solution heats up due to the heat of the solution of the hydroxyl ion, as is well known. Then the hydroxyl ion reacts at the surface of the silicon particles to produce both alkali metal silicate and hydrogen gas. The rate of reaction is both a function of the ratio of reactants and the molarity of the hydroxyl ion, herein designated as M, and is controlled by three factors:

1. Surface area of the silicon present (lump vs. powder),
2. The number of reacting moles present
3. The molarity of the hydroxyl ion in the solution, M, in mols $OH^-$ per liter.

In most situations, finely divided silicon produces the most efficatious products but lump silicon can be used when it is desired to reduce the rate of reaction between the hydroxyl ion and the silicon. The effect of silicon surface area was reviewed in order to compare rates of reaction and their effects upon oil recovery. This was accomplished by comparing rates of $H_2$ gas evolution from lump silicon to that generated from powdered silicon. The $H_2$ gas was collected under water and measured as a function of time. Using lump silicon resulted in a restricted reaction with time while powdered silicon gave an unrestricted reaction which fits an exponential power law equation. While initial stages of the lump silicon reaction is also exponential, it soon slows down due to the restricted surface area. Data using KOH were:

TABLE I

| | |
|---|---|
| Si Lump ($\approx 1''$): ml. $H_2$ = | 31.38 exp. 0.018 t |

TABLE I-continued

| Si Powder (<14 mesh) ml. H$_2$ = | 11.88 exp. 0.527 t | where t is in minutes. Thus the time required to collect 7100 ml of H$_2$ gas is: lump=300 minutes, and powder=12 minutes, a difference of 25 times.

By measurement of the H$_2$ gas volume evolved as a function of hydroxyl ion present and the silicon actually dissolved by reaction, I have determined the experimental stoichiometry of the KOH reaction to be:

$$0.15Si + 0.20OH^- \rightarrow 0.27H_2 + 0.15HSiO_3^-$$

or:

$$Si + 1.3OH^- \rightarrow 1.8H_2 + HSiO_3^-$$

It is immediately apparent that this reaction is not balanced since 3.00 OH$^-$ are needed to react with 1.00 Si to produce 1.00 H$_2$ plus silicate, ie:

$$0.067(Si + 3OH^- \rightarrow H_2 + HSiO_3^-)$$

In other words, when using 0.20 mol of OH$^-$, 3.7 times more H$_2$ is produced as would be expected and 2.25 times more silicon reacts as should, assuming the monomer is formed. Thus, there is an indication that some polymerization takes place and I believe that under the reaction conditions, a trimer, tetramer, and/or pentamer is formed. I have further discovered that the degree of polymerization is a function of the ratio of reacting components, as shown below.

When the NaOH system was compared to the KOH system by H$_2$ gas collection, I found that the NaOH system reacts much faster and more hydrogen will be generated per unit of time as set forth in Table II.

TABLE II

| System | Equation | H$_2$ Gas Volume Release (4.0 min) Calculated | Actual |
|---|---|---|---|
| KOH | V = 11.88 exp 0.527 t | 98 ml | 100 ml |
| NaOH | V = 26.52 exp 1.338 t | 5596 ml | 4850 ml |

Presumably these differences are due to the heat of reaction, as described below. Thus, for a long lasting treatment a KOH system might be desirable, or a combination of NaOH and KOH, while for a fast reacting treatment the NaOH system might be used. However, the experimental stoichiometry is considerably different for the NaOH system, compared to the KOH system. From H$_2$ gas collection the following stoichiometry is obtained:

$$0.15Si + 0.15OH^- \rightarrow 0.30H_2 + 0.15HSiO_3^-$$

or:

$$Si + OH^- \rightarrow 2H_2 + HSiO_3^-$$

Again, this reaction is not balanced because the following ratios are needed for a stoichiometric reaction, ie:

$$0.05(Si + 3OH^- \rightarrow H_2 + HSiO_3^-)$$

Here again, three times as much Si reacts as should, according to this simple stoichiometry, producing at least 3 times as much H$_2$ gas. Another way to emphasize the differences between the two systems is to show the amount of Si reacted per mol of OH$^-$ present as set out in Table III.

TABLE III

| | Reaction per Mol of OH$^-$ Present | |
|---|---|---|
| | mols Si reacted | mols of H$_2$ gas Produced |
| KOH | 0.83 | 1.50 |
| NaOH | 1.51 | 1.87 |

Thus the stoichiometries are quite different for the two systems:

| KOH | Si + 1.3 OH$^-$ → 1.8 H$_2$ + silicate |
| | or 0.83 Si + OH$^-$ → 1.5 H$_2$ + silicate |
| NaOH | Si + 0.67 OH$^-$ → 1.25 H$_2$ + silicate |
| | or 1.5 Si + OH$^-$ → 1.87 H$_2$ + silicate |

These reactions are not balanced but rather represent net yields of reactants and products since the actual reactions are quite complex. In the KOH system, 1.00 gram of Si produces 1440 ml of H$_2$, whereas one gram in the NaOH system produces only 1000 ml of STP H$_2$ gas. For oil-well stimulation, the KOH system produces more hydrogen gas, but is slower reacting than the NaOH system.

The actual formulation of the silicate produced may be determined by measuring the amount of Si reacted, the pH of the solution, and the specific gravity of the solution produced. The pH gives the amount of free hydroxyl ion left in solution and an assumption can be made that 1.00 Si produces 1.00 HSiO$_3^-$ ion by reaction with hydroxyl ion. For example, 1.00 KOH/2.40 Si (in mols) when reacted, produced an average formula of K$_2$(SiO$_3$)$_{2.41}$. When the reacting ratios are varied, then the average formula is also changed.

By carefully controlling the surface area of the Si, I have determined the degree of reaction (%R) between OH$^-$ and Si (expressed as %R(Si)) is exactly linear. Table IV shows that the equations predicting the %R(Si) depend slightly upon the molarity of OH$^-$:

TABLE IV

| | KOH + Si | |
| | % R(Si) = m (Ratio) + C | |
| Molarity of OH$^-$ | m | C |
|---|---|---|
| 2.0 | 76.11 | 11.08 |
| 3.5 | 61.47 | 26.99 |
| 5.0 | 60.79 | 16.91 |
| 6.5 | 71.71 | 9.66 | where Ratio=mols KOH/mol Si and m and C are constants of the equations. By averaging the data points at each molarity, one obtains an equation for KOH independant of molarity:

$$\%R(Si) = 74.36(Ratio) + 10.07$$

Thus 100% R(Si) requires 1.209 KOH/mol Si, or 2.90 KOH/2.4 Si.

For the NaOH system, based upon the data from Table V, a similar set of equations were developed:

TABLE V

| | NaOH + Si | |
| | % R (Si) = m. (Ratio) + K | |
| Molarity of OH$^-$ | m | K |
|---|---|---|
| 2.0 | 76.72 | 13.28 |
| 3.5 | 51.19 | 24.00 |
| 5.0 | 54.64 | 19.17 |

TABLE V-continued

| | NaOH + Si | |
|---|---|---|
| | % R (Si) = m. (Ratio) + K | |
| Molarity of OH⁻ | m | K |
| 6.5 | 57.57 | 15.01 |

Again, averaging the data points at each molarity gives an equation independent of molarity:

(NaOH):%R(Si)=65.34·(Ratio)+11.13

Therefore, 100% R(Si) requires 1.36 NaOH/Si or 3.26 NaOH/2.40 Si. This is a larger value than that of the KOH system.

Even more importantly, the reaction products produced can be characterized in terms of the degree of polymerization. Monomeric compositions are $KHSiO_3$ or $NaHSiO_3$. Assuming the polymeric form to be the pentamer, $K_2(SiO_3)_5$, or the tetramer, $Na_2(SiO_3)_4$, then both the monomeric forms (%m) and polymeric forms (%p) can be estimated as a function of reacting ratios of KOH/Si, or NaOH/Si. I have found that a large excess of silicon (1 MOH/8 Si, where MOH may be KOH, and/or NaOH) produces primarily polymeric species, whereas a low ratio (5 MOH/4 Si) produces mainly monomeric species. The actual values are shown as follows in Table VI.

TABLE VI

| | System | | | |
|---|---|---|---|---|
| Reacting Ratios | KOH | | NaOH | |
| (MOH/Si)—3.5 Molar OH⁻ | % m | % p | % m | % p |
| 1.0/8.0 | 16.7 | 83.3 | 13.7 | 86.3 |
| 1.0/4.0 | 35.2 | 64.8 | 21.0 | 79.0 |
| 1.0/2.0 | 51.7 | 38.3 | 61.0 | 39.0 |
| 1.0/1.0 | 80.0 | 20.0 | 78.0 | 22.0 |
| 5.0/4.0 | 86.0 | 14.0 | 88.3 | 11.7 |

Note that the predominant species can be controlled by the reacting ratio chosen, but that a mixture is always obtained. The reaction mechanisms are therefore indicated to be:

| KOH | $Si + 3 OH^- \rightarrow Si^{-3}(OH)_3$ |
|---|---|
| | $Si^{-3}(OH)_3 \rightarrow HSiO_3^- + H_2$ |
| | $5 HSiO_3^- \rightarrow (SiO_3)_5^{-2} + 5/2 H_2$ (polymeric) |
| | $HSiO_3^- \rightarrow SiO_3^{-2} + \frac{1}{2} H_2$ (monomeric) |
| NaOH | $Si + 3 OH^- \rightarrow Si^{-3}(OH)_3$ |
| | $Si^{-3}(OH)_3 \rightarrow HSiO_3^- + H_2$ |
| | $4 HSiO_3^- \rightarrow (SiO_3)_4^{-2} + 2 H_2$ (polymeric) |
| | $HSiO_3^- \rightarrow SiO_3^{-2} + \frac{1}{2} H_3$ (monomeric) |

More important are the oil recovery index (ORI as explained below) data collected. For either system the oil recovery index increased as the percent monomer (%m) increased, as shown by the following Table VII.

TABLE VII

| | Concentration of Reacting Hydroxyl Ion | | | |
|---|---|---|---|---|
| | 3.5 Molarity | | 5.0 Molarity | |
| System | % m | ORI | % m | ORI |
| KOH/Si | 19.0 | 16 | 21.2 | 15 |
| | 35.2 | 22 | 33.8 | 22 |
| | 61.7 | 26 | 69.8 | 29 |
| | 80.3 | 63 | 81.5 | 63 |
| | 86.3 | 73 | 91.0 | 63 |
| NaOH/Si | 13.7 | 31 | 41.3 | 25 |
| | 21.0 | 22 | 59.0 | 28 |
| | 61.0 | 54 | 67.7 | 63 |
| | 78.0 | 48 | 83.7 | 59 |
| | 88.3 | 55 | 90.3 | 67 |

Thus the monomeric species produces the better penetrating and/or dispersing agent. The monomeric composition appears to be the most active of those produced during reaction for crude oil release from a sand bed as measured by penetration and oil recovery index.

The oil recovery index (ORI) was developed in order to characterize the dispersant part of my new and improved crude oil treatment composition and indicates the penetrating power of any given chemical preparation. The procedure involves adding to clean test tubes predetermined amounts of dried sand and measured amounts of crude oil. It is important to use dried sand, freed from absorbed water, so that the oil can saturate the sand bed. After 24 hours standing, the so-prepared test tubes are ready for use. Exactly 10.00 ml of water is then added together with enough of the composition to exactly produce 50,000 ppm of solids in solution. This is determined by measurement of the specific gravity of the product solution (gms/liter) and then adding the required amount to give the 50,000 ppm. Concentration is calculated from the average formula: gm/1.=1209.84 (Sp.G)−1209.24. For 14 cm. test tubes, I have found that 18.0 gm of dried sand needs 4.00 ml of crude oil to saturate it. Then 10.00 ml of water is added, followed by the silicate. Penetration can be observed by the change in reflection within the sand bed as the dispersing agent penetrates therein as a function of time. By measuring the height of the sand bed (about 6.30 cm) and the depth of penetration during a given time, the penetration index (%P) can be determined. Since the oil is lighter than the solution once it is released, the oil floats to the surface where the layer it forms can be measured (as percent of that added to the sand bed). This is called the oil release index (ORI) and is a measure of the oil releasing power of any given preparation. By observing ORI as a function of time, I determined that it follows two basic types of formulae, namely logarithmetic and linear, to wit:

ORI=A exp (aT)

ORI=aT+C where "a" is a slope of the curve, "C" and "A" are constants, and "T" is in hours. Typical equations determined have been:

ORI(%)=12.1 exp 0.27t(r=0.99)

ORI(%)=5.30t+13.3(r=0.99)

where "r" is the statistical fit of the equation to the data. To determine the reproducibility of the test, five simultaneous runs were made, using the same chemical, crude oil and identical sand beds:

(ORI−2 hours)=26.6%±3.0%

The high degree of ORI for my new and improved composition is related to its penetration properties after two hours or more. For example, a series as shown in Table VIII having a ratio of moles NaOH/Si gave the following results:

TABLE VIII

| MOH/Si Ratio | % m | % p | ORI | % penetration |
|---|---|---|---|---|
| 1/8 | 17 | 83 | 16 | 41 |
| 1/4 | 35 | 65 | 23 | 56 |
| 1/2 | 62 | 38 | 32 | 52 |
| 3/4 | 65 | 35 | 57 | 82 |
| 1/1 | 80 | 20 | 63 | 88 |
| 5/4 | 86 | 14 | 83 | 97 |

Other commercial preparations such as "Kasil" (Philadelpha Quartz Co. brand of $K_2SiO_3$) gave less than 50% penetration under the same set of conditions.

By a correlation of gas collection data with the degree of polymerization induced, it is possible to correlate mechanisms of monomer and polymer formation. As discussed with reference to Table IX, the polymer formation is associated with $H_2$ gas production whereby two $OH^-$ groups combine to form silicate plus $H_2$ gas. For the NaOH system, the following data were collected:

TABLE IX

| Molarity of $OH^-$ | Ratio (NaOH/Si) | Reaction Temperature | Si | + NaOH | = $H_2$ |
|---|---|---|---|---|---|
| 2.5 | 1/2.4 | 65° F. | 1 | 1.1 | 1.7 |
| 5.0 | 1/8 | | 1 | 0.77 | 1.5 |
| | 1/3.7 | | 1 | 0.87 | 2.0 |
| | 1/2.4 | | 1 | 1.1 | 2.0 |
| | 1/1 | | 1 | 2.0 | 1.8 |
| | 1/2.4 | 45° F. | 1 | 0.80 | 0.30 |

For a given amount of Si, an increasing amount of hydroxyl ion is required as the monomer content increases. This relates to the proposed mechanism whereby:

$$Si + 3OH^- \rightarrow HSiO_3^- + H_2$$

Because cooling the solution reduces the $H_2$ gas yield, it is probable that the polymerization reaction is the exothermic one. Thus, to produce the desired monomer in solution, it is important to keep the solution cool. The polymer formation reaction then can be described as:

$$x\ HSiO_3^- \rightarrow (SiO_3)_x^{-2} + x/2 H_2 + \Delta H$$

where "x" is a characteristic of the system indicating the degree of polymerization and $\Delta H = +99.1$ Kcal/mol for the NaOH system, and 43.1 Kcal/mol for the KOH system. "x" is dependent upon the MOH/Si ratio as shown above.

At 70° F., the reproducibility of preparation is good, as shown by the following data in Table X for the NaOH system where (1) and (2) are two separate preparations reacted at the same time.

TABLE X

| Preparation | Reaction Molarity of $OH^-$ | Ratio | % R(Si) Calculated | % R(Si) Experimental | % m produced |
|---|---|---|---|---|---|
| (1) | 5.0 | 1:8 | 19.30 | 16.83 | 11.5 |
| (2) | 5.0 | 1:8 | 19.30 | 16.72 | 13.0 |
| (1) | 5.0 | 5:4 | 92.81 | 82.13 | 82.5 |
| (2) | 5.0 | 5:4 | 92.81 | 97.92 | 70.5 |
| (1) | 5.0 | 3:4 | 60.14 | 68.54 | 57.0 |
| (2) | 5.0 | 3:4 | 60.14 | 73.44 | 50.0 |

TABLE X-continued

| Preparation | Reaction Molarity of $OH^-$ | Ratio | % R(Si) Calculated | % R(Si) Experimental | % m produced |
|---|---|---|---|---|---|
| (1) | 6.5 | 3:4 | 60.14 | 63.76 | 73.5 |
| (2) | 6.5 | 3:4 | 60.14 | 77.35 | 44.5 |

Thus it can be seen that when the %R (Si) increases, the % monomer also increases. Although heating the solution serves to increase the total amount of Si which reacts to form soluble silicate, it is the % polymer which increases at the expense of the monomer. The enhancement of the reaction by heating is increased by an average of about 160% over that calculated from the experimental formulas given above. But the penetrating power of such preparations is not enhanced and usually is inferior to the regular method of preparation.

The reaction according to the present invention occurs in two steps: the dissolution of the alkali metal hydroxide particles accompanied by the evolution of heat of solution and the reaction of the hydroxyl ion on the surface of the silicon particles to form hydrogen gas and silicates. I have found that the nature of the hydroxyl ion and its source is quite important. For example, the presence of weak bases such as ammonium hydroxide retards the reaction and can even prevent it from taking place. Furthermore, while the solution heats somewhat, only when the ammonia is volatilized as $NH_3$ gas does the solution become very warm. In a properly controlled reaction without the ammonium hydroxide, however, the overall reaction is quite exothermic and produces considerable heat. The base used must be a strong base such as LiOH, NaOH or KOH. As Table XI points out if a weak base such as $NH_4OH$ is employed, even in conjunction with those strong bases, the %R(Si) is severely retarded:

TABLE XI

| Reaction in the Presence of $NH_4OH$ | | | |
|---|---|---|---|
| Ratios | % R (Si) 50% | % R (Si) 100% | deviation |
| KOH: 1.29/2.40 Si (50%) | 34.7 | — | −15 |
| 3.00/2.4 Si (100%) | — | 64.8 | −35 |
| NaOH: 1.43/2.4 Si (50%) | 56.5 | — | +6.5 |
| 3.26/2.4 Si (100%) | — | 55.6 | −44 |

Thus the use of $NH_4OH$ and other weak bases is not efficacious in the present invention.

I have further discovered that known dispersing agents such as the soluble trimetaphosphates, borates (borax) and/or sulfates of alkali metals may be used in conjunction with my new and improved composition. However, I have determined that my composition should first be prepared separately, then mixed in the desired proportions with generally up to 50% by volume of my composition with a saturated solution of the dispersing agent. Only in conjunction with my new and improved composition can the commercial agent be used for penetrating and dispersing in oil recovery. It is also to be pointed out that although I prefer to use water as the media for the solution of the alkali metal hydroxide, I have also found that methyl or ethyl or isopropyl alcohol provides some advantages in certain situations. For example, up to about 50% ethyl or methyl alcohol can be admixed with the water when a well is being treated in extremely cold conditions and it is desired to prevent the solutions from freezing.

I have also found that a good dispersing agent can be prepared by reacting alkali metal hydroxides, such as NaOH with silicic acid to form the monomer:

$$2NaOH + H_2SiO_3 \rightarrow Na_2SiO_3 + 2H_2O$$

However, this product by itself tends to polymerize rapidly whereas the composition prepared by reacting silicon and sodium hydroxide does not appear to do so nearly so rapidly, if at all. Furthermore, I have determined that the combination of silicic acid, silicon and alkali metal hydroxide produces a product which is superior to either the silicic acid or the silicon for certain applications in that the contact reaction for certain oils proceeds very rapidly, evolving substantial amounts of gases. Other approaches include mixing molar quantities of dialkylsilicates and silicon with sufficient alkali metal hydroxides to hydrolyze the dialkylsilicates to form alkali alcoholates plus silicates plus reaction products from hydroxyl ions and silicon.

In order to characterize the oil modification agent, $(Si(OH)_y$ which is the suspension of Si particles in a basic medium) a set of fractional distillation data were collected (fractional distillation has long served as a primary method of characterizing crude oils). By controlling the boiling pot temperature, successive fractions can be boiled at higher and higher temperatures. The use of a reflux column of at least 10-12 theoretical plates serves to increase the efficiency of fractionation and separation. A Pennsylvania crude oil (Bradford area) was used and the following distillation peaks were established:

TABLE XII

| Fractional Distillation Peaks Observed | |
|---|---|
| Old Crude Oil | New Crude Oil |
| 36° C. | 36° C. |
| — | 42 |
| 105 | 108 |
| 122 | 121 |
| 137 | 135 |
| 147 | 148 |
| 161 | 160 |
| 173 | 173 |
| 189 | 187 |
| 204 | 200 |
| — | 209 |
| 220 | 221 |
| 249 | 241 |
| 265 (est) | 265 (est) |

The "old crude oil" was a six months old sample while the "new crude oil" was newly received. The specific gravity of the oil was 0.803 or an API gravity of 45. The distilling apparatus was set to cut off above 265° C., although higher boiling fractions remained in the pot. The fractional distillation peaks are seen to be reproducible.

A 100%R(Si) product was placed in a beaker at room temperature (20° C.) and 100 ml of crude oil was floated on top. The two immiscible phases were gently swirled and the oil was then separated, using a separatory funnel. Care was exercised to exclude the aqueous phase from the oil. Several new peaks (set forth as temperature points in the following Table XIII) have appeared (created) in the modified oil and at least two peaks disappeared (destroyed) in the original oil, when modified.

TABLE XIII

| Modified Oil* | Original Oil* |
|---|---|
| 74° C. - new | 135° C. - lost |
| 80 - new | 265 - lost |
| 85 - new | |
| 192 - new | |
| 206 - new | |
| 224 - new | |
| 230 - new | |

*All other peaks from original oil were present

It is important to note that the ratio of low boiling components (<100° C. peaks) increased in the modified oil by 470%. While the production of gases was also noted, they were not quantitatively measured.

Two more runs were made on the same oil used for Table XIV, the oil being put into contact with my oil recovery composition and then separated as before for fractional distillation analysis. The same composition was used for the two successive contact modifications:

TABLE XIV

| Fractional Distillation Peaks Observed | | |
|---|---|---|
| Modified Oil | | |
| No. 1 | No. 2 | Original Oil |
| 34° C. | — | 36° C. |
| 42 | 44 | 42 |
| 74 | 74 | — |
| 85 | 86 | — |
| 106 | 103 | 108 |
| 114 | 114 | — |
| 124 | 124 | 121 |
| 133 | 134 | 135 |
| 140 | 139 | — |
| 145 | 148 | 148 |
| 152 | 154 | — |
| 156 | 160 | 160 |
| 167 | 167 | — |
| 171 | 172 | 173 |
| 180 | 187 | 187 |
| 194 | 204 | 200 |
| — | — | 209 |
| 224 | 216 | 221 |
| 236 | 230 | — |
| 244 | — | 241 |
| Ratio of Low Temperature Peaks (<100° C.) | | |
| 600% | 740% | 100% |

By examining the above results, it is apparent that my new oil recovery composition modifies oil to produce both gases and low boiling components merely by contact at room temperature through the interface of the two immiscible phases. By measuring the areas of all peaks boiling less than 100° C. as plotted on the strip-chart recorder, one can obtain a ratio of low temperature peaks. In the two analyses of modified oil shown above, the low temperature peak ratio of modified to original oil was 6.0 and 7.4 times that of the original oil, respectively.

Further evidence was obtained when the high boiling fractions from a previous run (wherein all fractions boiling less than about 265° C. had been removed) was subjected to further modification by combining them with a quantity of my oil recovery composition in the boiling pot. The mixture was heated to about 60°-70° C., only. Considerable gas resulted and further low boiling peaks were produced at: 70° C., 79° C., and 90° C. This shows that my composition modifies high boiling fractions of crude oil to produce low boiling fractions and gases.

It is also possible to compare various crude oils by fractional distillation. This is shown in Table XV.

TABLE XV
COMPARISON OF CRUDE OILS

| Pa.(Bradford) | Wyoming | | Oklahoma | |
| --- | --- | --- | --- | --- |
| | Douglas | Muddy | Heavy | Light |
| 106° C. | 117° C. | 126° C. | 33° C. | 120° C. |
| 113 | 132 | 135 | 101 | 131 |
| 118 | 146 | 117 | 139 | |
| 125 | 155 | 152 | 123 | 146 |
| 131 | 164 | 156 | 123 | 146 |
| | | 158 | | |
| 139 | 175 | 162 | 155 | 159 |
| 145 | 183 | 166 | 178 | 164 |
| | | 170 | | |
| 156 | 187 | 177 | 189 | 169 |
| 162 | 192 | 183 | 202 | 174 |
| 167 | 197 | 186 | 221 | 181 |
| 175 | 203 | 192 | 235 | 188 |
| 184 | 216 | 197 | 249 | 192 |
| | | 206 | | |
| 189 | 222 | 211 | 265 | 197 |
| | | 218 | | |
| 195 | 233 | 220 | | 204 |
| | | 232 | | |
| 202 | 240 | 238 | | 211 |
| 211 | | | | 215 |
| 231 | | | | 221 |
| 243 | | | | 215 |
| | | | | 221 |
| | | | | 226 |
| | | | | 233 |
| | | | | 251 |
| A: 14 | 13 | 19 | 2 | 29 |
| P: 18 | 15 | 20 | 12 | 22 |
| API: 45 | 48 | 38 | 18 | 44 |

In Table XV are listed the boiling peaks measured by fractional distillation for five different crude oils. "A" is the actual comparative area of low temperature peaks (<100° C.) recorded on a strip-chart recorder. The Oklahoma Heavy crude oil has essentially no light fractions while the others have varying degrees. "P" is the total number of peaks observed boiling above 100° C. API is the standard gravity of the oil as is known in the art.

I have further discovered that certain formulations seem to work better with one crude oil than another. For example, when I treated both the Pennsylvania crude and the Muddy crude oils with the same reagents, the Muddy responded more favorably than the Bradford. The results are shown in Table XVI along with those for the Douglas oil.

TABLE XVI
DISTILLATION CHARACTERISTICS OF THREE CRUDE OILS

| Reactants | (M) Molarity | % R(Si) | Maximum Bubbles | (%) ΔVisc. | A(%) | P | Des. | CR. | ΔT(°C.) |
| --- | --- | --- | --- | --- | --- | --- | --- | --- | --- |
| WYOMING MUDDY OIL: 20 DISTILLATION PEAKS | | | | | | | | | |
| KOH + Si | 5.0 | 50 | | −12 | −32 | 8 | 12-171 | 1-245 | +74 |
| | | 100 | X | −12 | +10 | 26 | 8-187 | 9-178 | −9 |
| | | 150 | | −14 | +21 | 19 | 4-210 | 3-207 | −3 |
| NaOH + Si | 5.0 | 50 | | −37 | −42 | 16 | 6-172 | 1-149 | −23 |
| | | 100 | X | −28 | −58 | 20 | 6-172 | 1-149 | −57 |
| | | 150 | | −17 | −95 | 19 | 6-193 | 3-147 | −46 |
| NaOH + Si + H₂SiO₃ | 6.5 | 100 | XX | −46 | −63 | 19 | 2-178 | 4-162 | −16 |
| NaOH + Si | 6.5 | 100 | X | −10 | −50 | 29 | 4-211 | 15-125 | −86 |
| PENNSYLVANIA OIL (BRADFORD): 19 DISTILLATION PEAKS | | | | | | | | | |
| KOH + Si | 5.0 | 50 | X | −6 | −100 | 17 | 11-161 | 7-204 | +43 |
| | | 100 | | 0 | −43 | 15 | 10-158 | 5-210 | +52 |
| | | 150 | | +15 | −100 | 19 | 8-131 | 7-211 | +80 |
| NaOH + Si | 5.0 | 50 | X | +12 | −100 | 20 | 7-133 | 9-217 | +84 |
| | | 100 | | +12 | −86 | 18 | 8-143 | 7-214 | +71 |
| | | 150 | | +12 | −12 | 21 | 7-171 | 7-182 | +11 |
| NaOH + Si + H₂SiO₃ | 6.5 | 100 | XX | −70 | −33 | 21 | 8-140 | 3-186 | +46 |
| WYOMING DOUGLAS OIL: 15 DISTILLATION PEAKS | | | | | | | | | |
| NaOH + Si | 5.0 | 50 | | −6 | −100 | 10 | 9-173 | 4-204 | +36 |
| | | 100 | X | −6 | +39 | 19 | 4-212 | 7-207 | −5 |
| | | 150 | | −6 | −100 | 12 | 5-156 | 2-195 | +39 |
| NaOH + Si | 6.8 | 100 | X | −6 | −88 | 16 | 2-237 | 3-177 | −60 |
| NaOH + Si + H₂SiO₃ | 6.8 | 100 | | 0 | 0 | 19 | 2-165 | 6-151 | −14 |

In Table XVI, "M" is the molarity of reacting hydroxyl ion and %R(Si) was varied as shown. Relative amounts of gas bubbles created were also estimated and the best gas-creating formulation indicated. "Visc." is the change of viscosity in percent observed in the oil layer in contact at room temperature with my new and improved oil modification fluid. Viscosity was measured by a rotating Brookfield Viscosimeter and is a kinematic measurement in millipoise. Distillation peaks of the modified crude oils are summarized as follows: "A" in the % change in Low Temperature Peaks (<100° C.) referred to above; "P" is the total number of peaks observed; "Des." is the number of peaks destroyed and their average temperature; "Cr." is the number of new peaks created and their average temperature, while "ΔT" is the difference between Des. and Cr. Thus, when ΔT=−°C., there is a lightening of the oil because of a lowering of the heavy molecular weight components (with high boiling temperatures). When ΔT=+°C., then more heavy molecular weight components are present in the modified oil and it has become thickened.

In the Muddy oil, the NaOH+Si reaction product gives good results. There is a significant lowering of oil viscosity and "A" is affected so that the Low Temperature Peaks (which I believe are gases or low boiling compounds dissolved in the oil) are decreased sharply and for the most part the oil is lightened. For gas production the silicic acid formulation seems to provide good results with the 100%R(Si) formulation. Formulations made at high M-values also favor high negative values of "T". It should be recalled that the %R(Si) factor controls the formation of monomeric/polymeric species in solution. The use of high M-value formulations also favor lightening of the oil (M is defined above).

Yet for the Bradford (Pa.) crude, these same formulations do not always have the same effect. The better formulation is the 50%R(Si) for gas production but the oil is thickened in nearly every case and there are marked increases in viscosity. The silicic acid formulation drops the oil viscosity by 70%, even though the oil is thickened by contact modification. Most of the formulations shown in Table XVI contain predominantly monomeric species in solution and I have also determined that a polymer predominant formulation will be better for Bradford crude oil recovery. For Douglas oil recovery, the better formulation seems to be the 100% R (Si formulation made at relatively high M-values).

In the Muddy oil, the viscosity lowering and negative "ΔT" change is much greater in the NaOH+Si system than for the KOH+Si system. This is surprising since it would seem that only the Si(OH)$_y$ agent should effect the degree and direction of oil modification. Yet, the nature of the soluble silicate is seen to have a definite effect on both viscosity change and the direction of modification (thinning or thickening) of a given oil, as can be seen in Table XVI. This is especially true for Muddy oil and the KOH+Si reaction product. Other trends as a function of %R(Si) can also be seen, particularly for Pa. crude oil where sizeable changes in viscosity and increases in "ΔT" occur.

Another illustration of the importance of the soluble product upon the direction of oil modification is shown in Table XVII.

TABLE XVII

COMPARISON OF MODIFIED OILS

| (A) ORIGINAL MUDDY | (B) MUDDY + 100% R(Si): 6.8 M (NaOH + Si) Created Peaks | | (C) MUDDY + 150% R(Si): 5.0 M (NaOH + Si + H$_2$SO$_4$) Created Peaks |
|---|---|---|---|
| 126° C. | 124° C. | | |
| 135 | 133 | 106 | — |
| 145 | 142 | 108 | 140 |
| 152 | 152 | 111 | 183 |
| 156 | 157 | 119 | 154 | 227 |
| 162 | 160 | 120 | — | 245 |
| 166 | 167 | 128 | — |
| 170 | 171 | 138 | 171 |
| 177 | 176 | 147 | — |
| 183 | 182 | 163 | 182 |
| 186 | 186 | 174 | — |
| 192 | 193 | 178 | 193 |
| 197 | 195 | 185 | 197 |
| 206 | 206 | 188 | 204 |
| 211 | 211 | 200 | 210 |
| 218 | — | 207 | 216 |
| 220 | — | 242 | 221 |
| 232 | — | | 234 |
| 238 | — | | 239 |
| A: 14 | 10 | | 0 |
| T: 19 | 32 | | 15 |
| Des.: | 4-227 | | 9-156 |
| Cr.: | 16-158 | | 4-199 |
| T.: | −69° C. | | +43° C. |

At the top of Table XVII I give the formulation of the oil modification fluid and in the column (A) I state the distillation peaks for the original oil. Column (B) is a 100%R(Si) reaction product which causes a marked lightening of the Muddy oil. The Column (c) shows a formulation made at 150%R(Si). The excess hydroxyl ion was then reacted with H$_2$SO$_4$, the quantity added calculated so as to exactly form Na$_2$SO$_4$, a known dispersing agent. Also shown under each column are the created fractions caused by contact modification at room temperature between the crude oil layer floating upon a layer of my new reagent. A comparison of fractions which were not changed during contact modification can also be easily made. Thus, the Muddy oil was considerably lightened by the appearance of 16 new and lighter fractions when a 100%R(Si) reaction product made at 6.8M with NaOH+Si was used. But the presence of soluble Na$_2$SO$_4$, as shown in Column (C), causes the same oil to become thickened. Thus, the soluble part of the reaction product must be carefully controlled so as to exercise the proper influence at the silicon particle surface where the oil molecules are being modified by the hydrogen being generated there. It should be noted that one way to effect such is to introduce soluble ions (homogeneous catalysis), whether metal ions or inorganic anions, into the aqueous phase prior to usage as an oil modification agent.

Because of the heat produced during reaction of the components to prepare the oil recovery agent (99,100 cal/mol of Si=1.6×10$^6$ cal./lb Si), it would seem useful to be able to react the components underground within the formation to enhance oil recovery. However, I have determined that this procedure cannot always be carried out wholly efficiently in the presence of crude oil and thus the formation of my composition should be carried out above ground before injection into the oil-bearing rock formation. If an oil layer is initially present on water, the addition of NaOH (or LiOH and/or KOH) pellets and Si particles starts the reaction to form H$_2$ gas and silicates. But the Si particles soon become light due to attached gas bubbles and they float to the surface where the oil is attracted to the H$_2$ still attached at the Si surface. An interaction then occurs and the reaction between OH$^-$ and Si ceases. For a 100%R(Si) reaction, only about 15%R(Si) actually resulted in the presence of oil. The following gas collection data show the oil uses up the H$_2$ gas:

TABLE XVIII

| | ml H$_2$ expected | ml H$_2$ produced | Si reacted | Stoichiometry |
|---|---|---|---|---|
| Oil test | 2180 | 560 | 1.64 gm | Si + 2.74 OH = .43 H$_2$ |
| prepared outside | 5600 | 5600 | 4.14 gm | Si + 1.2 OH = 1.8 H$_2$ |

The amount of H$_2$ absorbed by the oil was found to be 1620 ml, or 74.3%. If the preparation method is changed so that only oil is initially present, and then NaOH plus Si is added followed by water, the %R(Si) rises to about 45% for the KOH system but only 20% for the NaOH system. Such a system is not useful. I have further determined that a vigorously reacting solution of NaOH and Si effectively ceases to react when a small amount of oil is added to the system. Of 40 ml of oil added to the reacting system, only 23.5 ml (59%) was left floating on the surface, 10.5 ml (26%) was absorbed on the Si surface (as removed by centrifugation), and 6.0 ml (15%) was not recovered at all. Because the reaction was carried out in a closed reactor vessel equipped with a condensor, the only losses which could occur were by gas losses or by dissolution into aqueous solution and no evidence of the latter could be found nor was the oil lost due to volatilization.

I have found that I can prepare the oil recovery composition by controlling the amount of Si reacted during a first reaction and then adding more reagents to the first product to cause further reaction to take place. Then the addition of crude oil does not seem to block or retard the reaction between OH$^-$ and the silicon to the same degree mentioned before. Apparently, the presence of preformed silicate allows the reaction to continue, in spite of the presence of crude oil albeit more slowly. Therefore, to effect an in-situ reaction within the well-bore of alkali metal hydroxide and silicon so as to modify crude oil in place within the formation so as to utilize the H$_2$ gas produced and the heat of reaction, I have determined that my new oil recovery composition is preferably partially formed above ground. Then additional reactants in the form of sodium or potassium or lithium hydroxides and Si, (plus other powdered metals, and/or soluble metal ions, for catalysis if desired), are added to the first preparation just prior to injection into the underground oil-bearing formation. Such a method I call a double reaction. There are at least two methods to do this. First, a 50%R(Si) reaction can be effected which leaves about half of the silicon in a particulate state, but coated with a layer of silicates, and then the NaOH, KOH or LiOH is added at the proper molarity to produce 100%R(SiO) just prior to injection into the well. The remainder of the reaction takes place underground. Obviously, various combinations of %R(Si) on the first and second reactions can be used to produce the 100%R(Si) total. Another method for the double reaction is to prepare a 100%R(Si) product. The second reaction innvolves the addition of both NaOH, LiOH or KOH plus Si to the first product at the proper concentrations and molarity. The catalytic metals and/or soluble ions mentioned above can be introduced prior to or during the second reaction which can occur underground within the formation as desired. Other controllable factors include the amount of water present during reaction to control the specific gravity of the second reaction product, depending upon the permeability of the oil-bearing rock formation.

I have found that the preparation and usage of my new oil modification composition must be closely controlled because of the effect of air. It is sometimes preferable to prepare it directly at the well site and inject it immediately after preparation. Since sometimes this is not possible, I have found that the reacted reagent can also be prepared and shipped in a semi-solid form which remains stable in air over a period of up to a year. At the well-site the semi-solid material is diluted to proper concentration, the reactants are added, and the composition is injected into the oil-bearing formation. Such preparations are described below.

The usage of my composition depends upon the rock formation, as well as the type of crude oil involved. For shallow wells (400–800 foot depth) with low permeability, the treatment fluid is preferably poured into the well bore, which is then capped. After standing for 2–4 days, the well can then be pumped in a conventional manner. For shallow wells with higher permeability, the well treatment composition is first diluted to about 25,000 to 50,000 ppm. and then pumped into the well bore under about 150–1200 psi of pressure. Alternately, the well treatment composition can be poured into the well as before, followed by high pressure water. Higher dilutions can be used as required. For deeper wells it appears necessary to pump the well treatment composition into the oil-bearing formation under pressure. The dilution is varied as described before according to the permeability of the rock formation.

Some well fields have configurations which allow the use of an injection well and a collection well. One configuration, known in the art as a "five-spot" is a square with five wells, each on one corner and one in the center. The center well can function either as the injection well or the collection well depending upon the local underground terrain. In this method my composition is pumped under pressure into the injection well(s) and the pipe(s) are kept capped after pumping so as not to release any pressure generated underground.

Although I have shown only one general method of preparation for my new and improved oil modification composition, there are other methods which can also be used. For example, the silicate can be made by conventional methods such as reacting an alkali hydroxide and H$_2$SiO$_3$ together in solution. Alternately, an alkali metal carbonate and SiO$_2$ can be heated together in solid form, and the so-produced silicate is dissolved to form a solution. Either, or both, of these solutions then has the proper quantity of alkali metal hydroxide and silicon added prior to injection at the well site. Still another method involves heating an alkali metal hydroxide and Si, (plus other catalytic metals and/or ions as desired) together with H$_2$SiO$_3$, and/or SiO$_2$ in proper quantities in the absence of water to form a solid product. The solid can be shipped to the well site, diluted to proper concentration by the addition of potable water and injected into the oil-bearing formation.

In some cases it may be desirable to add known dispersing agents to the alkali metal hydroxide and silicon just prior to usage. The dispersing agents, which may include alkali phosphates, borates, sulfates, silicates, as well as organic-based agents, must be stable in basic aqueous solution. Yet another method includes the use of a low melting solid whose melt is used as a vehicle to contain alkali metal hydroxide plus silicon and/or other metallic particles. The melt is allowed to cool and solidify. The so-produced solid is dissolved in potable water just prior to usage at the well site. Useful solid salts include:

TABLE XIX

| | Melting Point | Boiling Point |
|---|---|---|
| Na$_2$B$_4$O$_7$.10H$_2$O (borax) | 57° C. | 200° C. |
| Na$_2$HPO$_4$.12H$_2$O | 35 | 180 |
| NaOH | 318 | 1390 |
| Na$_2$SiO$_3$.9H$_2$O | 47 | 100 |
| Na$_2$SO$_4$.10H$_2$O (Glaubers Salt) | 32 | 100 |

Many of these salts dissolve in their own water of hydration and then cool to resolidify. The potassium and lithium salts analogs can also be used. Borax itself is a good medium since it is an excellent dispersant as well. Other methods and combinations of methods, will occur to those skilled in the art.

The present invention will now be described in reference to the following specific examples. Such examples are presented for purposes of illustration only and should not be deemed as limiting the present invention. As Examples, I cite:

Four test methods are used to evaluate the efficacy of the preparation in the following Examples. While any one test may not show positive results, the results of all tests must be considered in evaluating the efficacy of the reactions.

1. Gas Evolution (gas—measured in cubic centimeters)

Exactly 125.0 ml of the solution, followed by 125.0 ml of crude oil are placed in a 250 ml. flask. The full flask is attached to a capillary gas collection column and allowed to stand for 48 hours. At least 5 cc of gas should be evolved.

2. Viscosity Change (ΔVisc.)

200 ml. of crude oil to be tested are placed in a 400 ml. beaker and a viscosity spindle is placed in the middle of the oil layer. 100 ml. of reagent is slowly poured into the beaker down the side so as not to disturb the rotating spindle, which is slowly raised as the reagent is introduced. This keeps the spindle within the oil layer at all times. About 2 hours recording time or observation will be required to determine the direction and change of the oil viscosity. A positive increase is usually associated with a thickening of the oil while a decrease is associated with a thinning of the oil.

Alternately, the reagent can be allowed to sit in a closed jar for a week. Many times a freshly prepared reagent has little or no effect upon oil viscosity even though the chemical composition of the oil changes as determined by fractional distillation analysis. The same reagent, aged a week, often causes large changes in oil viscosity immediately upon contact with the oil.

3. Fractional Distillation Analysis (ΔT, P, A)

100 ml. of the oil used for the viscosity measurement are placed in the boiling pot and a fractional distillation analysis is run as described above. ΔT is preferably negative and a large number of new peaks should be created.

4. Dispersing Power (ORI)

To a previously prepared test tube containing said saturated with crude oil add exactly 10.0 ml of water and the calculated amount of reagent, according to its specific gravity, to give a concentration of 50,000 ppm. Allow the test tube to sit at least 3 hours. Measure the height of the collected oil layer and convert to volume %. An ORI of at least 60 is expected.

EXAMPLE I

I weighed 136.0 gm of NaOH (pellets or flakes), and added this to a clean, dry 4 liter beaker. Next, I weighed 67.42 gm of powdered silicon metal (sifted through a 14 mesh screen) and added it to the beaker. I measured out 450 ml of pure fresh water and added it to the beaker. Initially, I stirred with a wooden paddle and then let sit. The water must be fresh, such as potable well water, not brackish. The solution will become warm, and then will boil. I let the reaction continue until all frothing ceases generally two to four hours. The product was semi-solid. I added 250–500 ml of fresh water and stirred to dissolve. The solution was a dark gray, with a suspension of fine particles in it. The specific gravity of the solution was taken and it was diluted to about 1.280 Sp.G. The oil recovery composition is ready for use. When tested on Wyoming Muddy oil, I found that 45 ccs. of gas were evolved with a change in viscosity of −30%. An ORI of 63 was found and the actual comparative area ("A") of low temperature peaks (<100° C.) recorded on a strip-chart recorder was −87%. The ratio in percent of the number of distillation peaks in the modified oil to the number in the original oil (P) was +5% and the difference between the number of peaks destroyed and their average temperature and the number of peaks created and their average temperature (ΔT) is −21° C.

EXAMPLE II

I weighed out 168.3 gm of KOH pellets (flakes could be used also) and added it to a clean 4 liter beaker. Next I weighed out 67.42 gm of powdered Si (sifted through a 14 mesh screen) and added it to the beaker. Exactly 600 ml of potable water was added stirred with wooden paddle and let sit to react. When frothing had ceased (reaction takes about 3–4 hours) 250–500 ml of fresh water was added and stirred to dilute to a specific gravity of 1.320. This solution was dark gray in color, and is ready for use. If desired, LiOH can be substituted in whole or in part for the KOH. The test results are as follows:

| Wyoming Muddy Oil | Pennsylvania Bradford Oil |
|---|---|
| Δ VISC - −12% | 0 |
| ORI - 74 | 68 |
| A - +10% | −43% |
| P - +30% | +10% |
| Δ T - −9° C. | +46° C. |

EXAMPLE III

Examples I and II are designed to produce primarily monomeric species of silicate in solution. If a solution rich in polymeric species is desired, the following procedure is used. In test one I reacted 40.00 gm of NaOH and in another 56.10 gm KOH, with 224.72 gm of powdered Si in about 150 ml of potable water. For both the NaOH or KOH, the %R(Si) is about 19%, leaving about 80% of the Si unreacted. I then diluted the solutions as before with 250 ml of fresh water, and then filtered to remove the excess Si particles before use. A coarse filter was used so that substantial Si particles were left in suspension in the mildly basic solution. For NaOH/KOH mixtures, I substitute about 1.40 gm of KOH for each gm of NaOH, and vice versa. The preparation procedure and test methods follows that already given in Example I.

| Pennsylvania Bradford Oil |
|---|
| Visc - +15% |
| ORI - 18% |
| Gas - 7 cc |
| A - +43% |
| P - +10% |
| Δ T - +46° C. |

EXAMPLE IV

Another useful formulation is based upon the 15%R(Si) reaction calculation, where a large excess of base is present. Since many oil wells have been "fracked" with strong acid, notably HCl, and still contain sizable traces of acid in the well bore, the use of the 150%R(Si) (where % is percent of reaction) product is indicated to counteract this condition. In one case the preparation uses 195.6 gm of NaOH, and in the other 252.5 gm of KOH. These bases were added dry to 67.42 gm of powdered Si (14 mesh) together with about 480 ml of potable water and allowed to react. Immediately after reaction has ceased, I added an additional 250 ml of fresh water, since the preparation has a tendency to solidify and lose its efficacy, especially in cold weather and immediate dilution prevents this from happening. Combinations of NaOH and KOH can be made, as described previously. The test procedures indicated the following results for Wyoming Muddy Oil:

|         | NaOH System | KOH System |
|---------|-------------|------------|
| Δ Visc. | −17%        | −14%       |
| A       | −95%        | −21%       |
| P       | −5%         | −5%        |
| Δ T     | −46° C.     | −3° C.     |

EXAMPLE V

Another useful preparation is the double reaction. The first reaction can be made at 50%R(Si) and the second to produce 100%R(Si). I weighed out 68.00 gm of NaOH, 67.42 gm of powdered Si (14 mesh), and added it to a clean, dry 4 liter beaker, I then added 262 ml of potable water. When the frothing had ceased, 262 ml of fresh water was added and the mixture stirred to obtain a uniform mixture. Then I added 68.00 gm of NaOH with stirring and allowed the reaction to begin again. When the frothing has again stopped, the specific gravity of the solution is obtained and the solution is diluted to about 1.250 Sp.G. The double-reaction product is now ready for usage, as outlined in Example I. The second reaction of the double reaction has a tendency to react much slower than the usual reaction and it may be necessary to allow the reacting products to stand somewhat longer than usual before dilution to the final well stimulation fluid product. Alternately, each gram of NaOH can be substituted by 1.40 gm of KOH, or 0.587 gm of LiOH, to produce mixed alkali silicate products, as desired. The test methods and results follow those of Example I.

| Wyoming Muddy Oil | |
|---|---|
| Δ Visc | +24% |
| A | −100% |
| P | 0 |
| Δ T | −71° C. |
| ORI | 43 |
| gas | 5.5 cc. |

EXAMPLE VI

The use of a commercial dispersing agent in conjunction with my new and improved oil recovery agent is sometimes very useful. Such preparations are made as follows. The procedures of Example I for NaOH+Si or Example II for KOH are followed. A 1000 ml beaker is set up and 150 ml of potable water added to the beaker. I added each of the following quantities of commercial agents and stirred until I added each of the following quantities of commercial agents and stirred until a clear solution resulted:
  sodium silicate (1:2.4 ratio) 100 ml of 1.4.5 Sp. G.
  sodium sulfate.10H$_2$O—add 66.72 gm to 250 ml of water; add to beaker
  sodium carbonate.10H$_2$O—add 107.95 gm to 250 ml water; add to beaker
  sodium tetraborate (borax)—add 44.98 gm to 250 ml water; add to beaker.
  trisodium phosphate—add 35.98 gm to 250 ml of water; add to beaker
  sodium hexametaphosphate—34.48 gm to 250 ml of water; add to beaker.

The potassium ion analogs may be substituted for any of the above. The MOH+Si reaction product is diluted by the chosen commercial agent just prior to usage. The test results follow those of Example I.

| Heavy Oklahoma Oil Borax with NaOH + Si |
|---|
| Δ Visc - 0 |
| A - +914% |
| P - +8% |
| Δ T - +10° C. |

EXAMPLE VII

The preparation of a dispersing agent from silicic acid is accomplished by the following procedure. A clean dry 4 liter beaker is set up and 800 ml of potable water is added. I weighed 78.10 gm of silicic acid and stirred into the beaker to form a suspension. I then added 216.0 gm of NaOH with stirring, followed by 67.42 gm of powdered Si (14 mesh). The cloudy suspension became warm and cleared up due to reaction between NaOH and silicic acid. This was then followed by the normal reaction between hydroxyl ion and Si. The composition is used immediately. Alternately, KOH is substituted for the NaOH, as in prior Examples. A further variation involves the addition of 0.25 gm of Pt black just prior to the Si addition or about 0.63 gm of Raney Ni may be substituted for the Pt black. If the crude oil contains considerable sulfur, the addition of 1.20 gm of Mo powder may be substituted. The finished reagent was tested as in the methods of Example I.

| Wyoming Muddy Oil | |
|---|---|
| gas | 36 cc |
| Δ Visc | +46% |
| A | +63% |
| P | ±5% |
| ΔT | −16° C. |

A particularly useful combination of dispersants and oil modification agents is made as follows: I weighed out 203.62 gm of NaOH, plus 70.37 gm of Si (14 mesh), I added both to a dry clean 4 liter beaker and then added 0.15 gm of Mo powder. I added 900 ml of potable water to initiate reaction. When the frothing has ceased, one of the following acids is added to the reaction mixture:
  H$_3$PO$_4$ (85%)—28.4 ml
  H$_2$SO$_4$ (96%)—32.2 ml
Care must be exercised since the reaction is exothermic when strong acid is added to a highly basic solution such as that being prepared. Spattering can easily occur and the operator can be easily burned. The final pH of the solution needs to be at least pH=11.5. Adjust with more NaOH solution if necessary to react the pH of 11.5. KOH can substitute for NaOH as desired, as described before. The produced reagent is tested according to the methods of Example I.

| Oklahoma Heavy Oil (H$_3$PO$_4$) | | Wyoming Muddy Oil (H$_2$SO$_4$) | |
|---|---|---|---|
| Visc | − 5% | Δ Visc | −14% |
| A | +257% | A | −100% |
| P | +75% | P | −25% |

-continued

| Oklahoma Heavy Oil (H$_3$PO$_4$) | | Wyoming Muddy Oil (H$_2$SO$_4$) | |
|---|---|---|---|
| T | −3° C. | ΔT | +43° C. |

EXAMPLE IX

A 55 gallon steel drum with a removable cover was obtained. Both were washed thoroughly. The reaction ratio used was 3.55 mole of NaOH pellets per 2.40 mole of Si which gave a ratio of 1.479 mole of NaOH per mole of Si. To prepare 40 gallons of solution, 747.0 mole (65.82 lbs.) of NaOH pellets (commercial grade—98.4% NaOH plus about 0.4% Na$_2$CO$_3$) was weighed, together with 31.25 lbs. of Si (commercial grade—one inch lump plus fines—98.8% Si, 1% Fe, 0.4% Al). The Si was added to the barrel and then 27.8 gallons of pure water was added. The hydroxide ion molarity would then be 7.1M.

The NaOH was then added in increments. The first was 25.0 lbs. (M=2.697). The second addition was also 25 lbs., added within minutes of the other. (M=5.394). This gave an overall reaction ratio of 1.1235, or 2.696 mole NaOH 2.40 mole Si. The first NaOH addition caused foaming and rather violent bubbling. When the bubbling had quieted down (about 15 minutes), the second addition caused more bubbling, but less violent. After about 4.5 hours, the last addition of 15.82 lbs. of NaOH was added. Further bubbling resulted which ceased in about 5-6 hours of reaction time. The first segment of reaction gave a mixture of about 34.4% polymer to 63.8% monomer. The second addition then gave a mixture of 12.6% polymer to 87.4% monomer. After reaction, there were 17.5 gallons of liquid having a specific gravity (Sp.G.) of 1.582. This preparation was made to obtain a 100%R(Si). Since the NaOH was added in increments (due to volume limits) to prevent boiling over, only 74.4% of the Si reacted, resulting in a strongly basic solution. The liquid was diluted to 44.0 gallons of Sp. G.=1.252.

Field testing was done in Converse County, Wyoming in an oil formation called the "MUDDY". The "MUDDY" lies at 5000 foot depth and is about 15 feet thick at Glenrock. The oil is light (API=38) and paraffinic. No. 8 Well was chosen on the lease for this test. It is a stripper well pumping about 10.0 barrels of fluid daily (on a 20% duty cycle, as are all the wells on this property). The measured % oil in the fluid was 13.2% which gives a daily production of 1.32 barrel of oil.

A truck was used which had a load of 65 barrels of fresh water. When the 44 gallon was added, a solution containing 3100 ppm. was obtained. This was pumped through the tubing (2.5 inch steel pipe) to the bottom at a temperature of 205° F., and about 550 psi. pressure, into the oil bearing formation. When about 4.0 barrels of the composition had been pumped in, the hot solution reacted with the crude oil and a back pressure built up "down-hole". The back pressure went to 1500 psi and pumping stopped. The pressure then dropped to 200 psi. within 2 minutes. When pumping resumed the pressure again went to 1500 psi (bursting strength of the pipe was about 1800 psi.) and dropped to 200 psi. when pumping stopped. The problem was not paraffin-blockage but a back pressure caused by accelerated reaction of the fluid with crude oil at higher than necessary temperature.

The truck then hooked up to the casing (7 inch diameter). Ten barrels of the above composition (205° F. and 550 psi.) were then pumped down into the bottom-hole. About 100-150 lbs. pressure resulted at the well-head at the top of the ground. This "blow-off" took about 3-4 minutes and a strong smell of hydrocarbon gas was noted. Then the well went on "vacuum". Pumping resumed but 10 barrels of hot fluid resulted in another "blow-off"]of even longer duration. The truck then hooked up to the tubing but less than a half barrel resulted in a down-hole pressure buildup of 1500 psi. Only about 25-26 barrels of fluid were actually injected into this well. The well was then shut down for 2 days.

Oil production was as follows:
FIRST DAY: pumping water only (6 barrel (bbl.) of fluid—little oil seen)
SECOND DAY: pumping mostly water (slight show of oil—5% estimate)
THIRD DAY: pumping oil, measured 71.43% oil (increase of 5.4 times). 7.0 bbl. of fluid total=5.00 bbl. of oil=379% increase.
FOURTH DAY: pumping oil (about same water/oil ratio) about 10.0 bbl. of fluid daily. This is 541% increase.

In four days of pumping, this well pumped 12.2 barrels of oil. Expected volume was 5.28 bbl. of oil. The increase was 231%. Pumping continued. The oil ratio continued to climb until at the eighth day the fluid was nearly pure oil. Over an eight day period, the oil recovered was close to 45.6 barrels, an increase of 441%. Pumping continued.

EXAMPLE X

A 55 gallon steel drum with removable lid was cleaned thoroughly. 31.25 lbs. of commercial grade Si (one inch lump plus fines) was added to the drum containing 27.8 gallons of pure water. Next, 65.82 lbs. of commercial grade NaOH was added all at once. Boiling began almost immediately. The reaction lasted about 8 hours. It was necessary to cool the sides of the barrel periodically to keep the reacting mixture from boiling over. At the end of about 8 hours, about 20 gallons of liquid remained having a Sp. G. of 1.503. This was diluted to 42.5 gallons of Sp. G.=1.264.

The same truck was used. A load of 65 barrels of fresh water gave a solution of 3250 ppm. of solids. No. 11 Well in this lease was chosen to be treated, in the same "MUDDY" formation. This well pumped both water and oil, the average being about 10 bbl. of fluid containing 0.79 bbl. of oil. The solution was pumped hot through the casing (7 inch diameter) at 205° F. and 450-550 psi. down into the formation at 5000 foot depth. At the end of the pumping (about 40 minutes=1.6 barrel fluid per minute), the hose was removed. About 100 psi of hydrocarbon gas pressure had built up at the well head. This took about 5 minutes to blow off. A strong smell of hydrocarbons was detected. These wells in this formation never had gas present before. The well was shut down for two days.

Oil recovery was as follows:
FIRST DAY: pumping water (about 6 bbl. of fluid-)—21 inches in tank.
SECOND DAY: pumping water—24¼ inches in tank=10.6 bbl. (slight trace of oil).
THIRD DAY: pumping oil—nearly pure oil, about 12 bbl. oil per day
FOURTH DAY: pumping nearly pure oil—close to 16 bbls. of oil this day.

At the end of the fourth day, water was drained off and about 40 barrels of oil was shipped, leaving a tank depth of 21 inches left (1"=3.19 barrel). Over 16 days this well pumped 124.7 barrels of oil, an increase of 885%.

EXAMPLE XI

A 55 gallon steel drum with removable lid was washed thoroughly. A ratio of 3.55 mole NaOH per 2.40 mole of Si was used. This should give 100%R(Si). 14.85 lbs. of powdered Si (commercial grade, 8 mesh plus fines, 98.5% Si, 1% Fe, 0.4% Ca) was added to the barrel containing 13.2 gallon of pure water. Then 31.3 lbs of NaOH pellets (commercial grade) were added. This gave a 7.1M solution of hydroxide ion. Boiling began and the sides of the drum had to be sprayed to keep the solution from boiling over. At the end of about 3.5 hours, a layer of unreacted Si particles remained floating on the surface of the liquid. The volume was then 10 gallons. This reaction gave a solution containing about 98% monomer. The liquid was diluted to 20.0 gallons and 14.85 lbs. of Si (8 mesh plus fines) was added. Reaction began again as the 31.3 lbs. of NaOH pellets was added in 1–3 lb. increments over a period of 2 hours. The preparation became thicker and began rolling. The top would expand up the sides of the barrel, stretch, and collapse, then repeat itself. This kept up over 4–5 hours. When this DOUBLE REACTION finished (overnight), the very thick solution was again diluted to 20.0 gallons, and 14,85 lbs. of powdered Si (8 mesh plus fines) was again added (this gives a Triple Reaction). Then 31.3 lbs. of NaOH pellets were added incrementally as before, over a period of 4 hours. Boiling and rolling commenced again and continued over a period of 5–6 hours. The final volume was very thick and measured about 17.5 gallons. This was diluted to a 40 gallon volume of Sp.G.=1.624.

In one part of the South of Glenrock lease, No. 12 Well is a water-flooding injection well, feeding No. 13 Well. The latter pumps 650 barrels of fluid daily. A sample of fluid contained about 2.86% oil so that the production that day was about 18.6 bbl. oil. This may vary slightly up to 30 bbl. of oil per day. The above barrel of Triple Reaction was diluted in the tank of the truck by 65 barrels of fresh water to give a solution of 6982 ppm. of solids. The water-flood piping was disconnected at No. 12 Well, the truck hooked up, and the solution was pumped in at 105° F. and 550 psi, over a period of 50 minutes.

The piping of No. 12 Well was again reconnected and water-flooding resumed.

Oil recovery experience at No. 13 Well was as follows:

FIRST DAY: pumping fluid, still about 650 bb. per day, about 3% oil.

SECOND DAY: still pumping water plus 3% oil—same volume.

THIRD DAY: pumping water plus 3% oil.

FOURTH DAY: pumping water plus about 8% oil (estimate). Oil increase about 33 barrel per day. Output increase=+280%

TENTH DAY: pumping about 25.0% oil. Oil increase about 162.5 barrels of oil. Output increase=+874%

ELEVENTH DAY: pumping about 22.7% oil. Oil increase about 147.6 barrels of oil. Output increase was about +797%.

TWELVTH DAY: pumping water (650 bbl.) plus about 23.1%. This is 150.2 barrels of oil. Increase=+812%.

The total oil recovery over this period was close to 584.3 barrels of crude oil. Expected output from this well was 222 barrels. The increase due to water-flood techniques in this field was +263%.

EXAMPLE XII—CHEMICAL MODIFICATION OF CRUDE OILS USING COMMERCIAL PREPARATIONS

A number of commercial alkali silicates are manufactured on a large scale in the U.S. Two major producers are Diamond Shamrock Corp. (hereinafter DS), and Philadelphis Quartz Co. (hereinafter PQ). Both prepare their products by high temperature fusion of soda-ash and high purity sand. The products include so-called "orthosilicates" and "metasilicates". These are achieved by: (1) varying the ratio of sand to soda ash, (2) specific methods of fusion (time-temperature profile), (3) methods of subsequent dissolution in water. However, the same chemical product, that is orthosilicate, $Na_4SiO_4$, will not be exactly the same from manufacturer to manfacturer because of by-products formed during the fusion and dissolution steps. All of these silicate products are highly basic when dissolved in water. The present invention differs inter alia because the product is an alkali silicate in a strongly basic solution, containing suspended Si particles. Contact with a liquid hydrocarbon results in a chemical modification of that hydrocarbon at the liquid-aqueous interface in conjunction with the Si particle surface, provided the hydrocarbon contains labile reactive bonds. The present example considers whether a mechanical mixture of Si particles and commercial silicate would react in a similar way, provided the soluble mixture were controlled properly. The following describes results obtained on several crude oils.

Methods

My standard methods for determining net gas generation, net change in API gravity, and fractional distillation analysis of oil modification has already been described above. Most of the data given will that of gas generation, since that is what the present system under study does best.

Four materials, representing a spectrum of manufacturers and products, were used. These were: PQ-orthosilicate (Metso-200), DS-orthosilicate, DS-Metasilicate as the pentahydrate, and a polysilicate of unknown composition by Baker Chemical (suspected to be about a 1 Na:2.4 $SiO_3$ ratio). Other materials were present but were not used in these tests.

Results

I chose the Metso-200 product for initial work because I had a larger sample on hand than the others. Two concentrations were used: (1) about 0.05 molar (dilute, and (2) about 1.0 molar (concentrated). I used the published molecular weights or referred to chemical tables for specific gravity values. To 100.0 ml. of solution, I added exactly 0.10 gram of powdered Si (−325 mesh) which was then added to 100.0 ml. of crude oil in the gas collection flask. The following shows how selected oils were affected:

Effect of Si Particles

My system results from a specific reaction between hydroxyl ions and the Si particle surface. Electron interchange is part of this mechanism. The product consists of silicate ions, both those already solubilized and those still attached at the Si surface. Because of an inferred steric effect which occurs during the oil modification process, I suspect that the product may be related to $Si_3O_9$ ions and to $Si_4O_{10}$ units, which are related to clay mineral building blocks. It would thus seem that the presence of Si particles would be essential to the oil modification and gas generation process. The following tests confirm this observation:

TABLE I

Effect of Presence of Si Particles on Gas Generation
Conditions: 1.00 molar $Na_4SiO_4$ (Metso-200) + 0.1 gm. Si particles (−325 mesh).

| | gas volume | net gas | API |
|---|---|---|---|
| KNOX OIL - Forest Co., Pa.: API = 48.92; Contained gas = 40.1 cc; API = +.41 | | | |
| Orthosilicate Only | 11.4 cc. | −29 cc. | +.06 |
| Orthosilicate + Si | >55 cc. | >+15 cc. | −.28 |
| STILES OIL - Texas (Serpentine Form.): API = 39.50; Gas = 17.8 cc; API = −.15 | | | |
| Orthosilicate Only | 1.8 cc. | −16 cc. | +.02 |
| Orthosilicate + Si | >119 cc. | >111 cc. | −.15 |
| Dickson Oil - Ellis Co., Texas: API = 38.457; Gas = 4.5 cc.; API = +.61 | | | |
| Orthosilicate Only | 2.1 cc | −2.4 cc | +.31 |
| Orthosilicate + Si | 91.8 cc | +89 cc | +.08 |
| COOPER OIL - Forest Co. (Pa.): API = 45.82; Gas = 17.6 cc; API = −.12 | | | |
| Orthosilicate Only | 19.6 cc. | +2 cc | +.18 |
| Orthosilicate + Si | >119 cc. | >102 cc | −.56 |

It is apparent that the gas generation effect is dependent upon the presence of Si particles. In two cases, the 100 ml. gas collection burrette was completely emptied so that the given values must be regarded as minimum. In the absence of Si particles, no gas was generated and only that naturally contained in the oil was seen. Negative gas values means that less gas evolved from the oil than would have in the absence of the orthosilicate. The ratio of gas volumes generated in the presence and absence of Si particles for the four cases exhibited above varied from about 5 times to over 60 times.

Effect of Concentration

Two concentrations were employed: Dilute=0.05 molar; Concentrated=1.00 molar. The orthosilicate was again Metso-200. The following shows this effect:

TABLE II

EFFECT OF SILICATE CONCENTRATION

| | cc. Gas | net Gas | API |
|---|---|---|---|
| CLARENDON OIL - Forest Co. (Pa.): API = 46.89; gas = 50.0 cc; API = −.07 | | | |
| Dil. | >119 | >+59 cc. | +.45 |
| Conc. | 91.8 | +42 cc. | +.08 |
| LIBERTY OIL - Cornplanter Co. (Pa.): API = 35.86; gas = 6.0 cc; API = −.10 | | | |
| Dil. | >119 | >+113 cc. | +.29 |
| Conc. | >119 | >+113 cc. | +.59 |
| STILES OIL - Texas (Serpentine Form.): API = 39.50; gas = 17.8 c.; API = −.15 | | | |
| Dil. | 117.0 | +99 cc. | +.21 |
| Conc. | >119 | >+111 cc. | −.15 |
| COOPER OIL - Forest Co. (Pa.): API = 45.82; gas = 17.6 cc.; API = −.12 | | | |
| Dil. | >50 | >+32 cc. | −.56 |
| Conc. | >119 | >+111 cc. | −.05 |

For the most part, dilute concentrations were more effective in gas generation than the more concentrated formulations. In all cases, substantially more gas volume was generated than was contained in the original oil. It is also apparent that some oils are lightened and some oils become thickened as the hydrocarbon gas volumes are generated.

Gravimetric Analysis of Oil Changes

Although changes in API gravity would seem to be significant, it would be much better to analyze actual changes occurring in the oil itself. One simple way to do this is to weigh the oil, distill it, and weigh the residue. In my method (1), the distillate represents the light and heavy naphtha fractions (gasoline fractions) plus the lower part of the light oil (kerosene) fraction. The residue represents the light and heavy gas oil fractions (lubricating oil fraction) plus the residue (asphaltenes if present). The total of these two minus the original weight gives the volatile fraction, that is, those gases and lights dissolved within the oil but not condensable following volatilization. The following gives some of these results as applied to orthosilicate+Si particles.

TABLE III

GRAVIMETRIC CHANGES DUE TO GAS GENERATION BY ORTHOSILICATE + Si Particles

| | Distillate | | Residue | Volatiles | | |
|---|---|---|---|---|---|---|
| | API | % change | (% change) | (% change) | Net Gas | API |
| LIBERTY OIL - Dist.: % = 27.7, API = 44.6; Res.: % = 71.8; Vol.: % = 0.5 | | | | | | |
| Dil. Metso-200 | 47.8 | −6.7 | +5.8 | +.9 | >+113 | +.29 |
| Conc. Metso-200 | 63.1 | −6.0 | +.4 | +5.6 | >+113 cc. | +.59 |
| CLARENDON OIL - Dist.: % = 41.2, API = 63.4; Res.: % = 52.9; Vol.: % = 5.9 | | | | | | |
| Dil. Metso 200 | 66.3 | −4.6 | +7.9 | −3.3 | >+59 | +.45 |
| Petredox 1MS401 | 62.4 | +2.1 | −4.9 | +2.8 | +10 cc. | +123 |

It is easily seen that the effects of dilute and concentrated Metso-200 solution, in the presence of Si particles, differs considerably. For Liberty oil, the light fractions (distillate) decrease while both they heavy fraction (residue) and dissolved gases (volatiles) increase. Meanwhile, the API gravity has increased and gas generation volume was high. Yet the residue increased as well. One conclusion might be that the increase in dissolved gases is the overwhelming factor for the API increases observed. The same may be said for Clarendon oil, except that a Petredox formula, especially developed for this oil, increases the API gravity by much greater factor while generating a modest increase in gas volume. It does so by degradation of heavy fractions (residue) to form gasoline fractions (distillate) and dissolved gases. Note that the commercial orthosilicate does not have such an effect. Thus, one must conclude that the silicate being formed in the Petredox product is not the same as the commercial ones available.

Comparision of Commercial Silicates

Four materials were evaluated:
1. Metso 200 (PQ):
   $Na_4SiO_4$, M.W.=184.05; 100 cc. of 0.5M solution requires 9.20 g.
2. D.S. Ortho:
   $Na_4SiO_4$, M.W.=184.05; 100 cc. of 0.5M solution requires 9.20 g.
3. D.S. Meta-Penta:
   $Na_2SiO_3 \cdot 5H_2O$, M.W.=212.15; 100 cc. of 0.5M solution requires 10.61 g.
4. Baker Poly:
   Sp. G.=1.4026–2.50 mol/liter; 100 cc. of 0.5M solution requires 20.0 ml. added to 80.0 ml. of water.

The tests were conducted in the same manner given above, with 0.10 gm. of powdered Si (−325 mesh) added to each test. The following shows results obtained:

TABLE IV
COMPARISON OF OIL MODIFICATION BY VARIOUS COMMERCIAL SILICATES.

| D.S. Ortho | | Metso 200 | | Meta-Penta | | PolyBaker | |
|---|---|---|---|---|---|---|---|
| net gas | API | net gas | API | net gas | API | net gas | API |
| CUMMINS OIL - Pa.: API = 48.07; dissolved gas = 36.5 cc.; API = −1.07 | | | | | | | |
| +116 cc | −.22 | −28 cc. | −.45 | +67 cc. | −.45 | −9 cc. | −.34 |
| CLARENDON OIL - Pa.: API = 46.89; dissolved gas = 50.0 cc.; API = −.07 | | | | | | | |
| −1 cc. | −.22 | +59 cc. | −.44 | −3 cc. | −.44 | NOT RUN | |
| SAN ANDRES #13 (TEXAS): API = 32.18; dissolved gas = 5.6 cc.; API = −.10 | | | | | | | |
| −4.4 cc. | −.66 | −4.8 cc | −.57 | −3.6 cc | −1.41 | 0.0 | −1.65 |
| DENNIS OIL (TEXAS): API = 43.19; dissolved gas = 16.4 cc; API = +.04 | | | | | | | |
| −49 cc | −.14 | +179 cc. | −.86 | +28 cc | +.10 | +3 cc | −.25 |

It is obvious that D.S. Ortho works well with Cummins oil, as far as gas generation is concerned. Metso-200 does not work at all. In contrast, the Metso-200 works with both Clarendon and Dennis oils while the D.S. ortho does not. This shows that the two so-called "ortho-silicates" are not exactly the same. The "poly" silicate does not seem to work with any of these oils. But the "meta-penta" compound appears to lighten the Dennis oil.

Conclusions

The present example has demonstrated several factors important in the present invention:

1. The presence of Si particles is necessary to obtain significant oil modification and gas generation.
2. Silicate by itself does not appear to cause oil modification.
3. The degree of dilution of a given commercial silicate has a significant effect upon the amount of gas generated. It also has a definite effect on the mode of oil modification. In one of the few cases tested, the gasoline fraction was increased; in most of the others, the heavy fraction increased. The overall effect apparently depends to a large degree upon the oil being modified.
4. The silicate product prepared in the optimized Petredox product is not the same as the commercial products tested, as far as the observed effects upon a selected oil is concerned. The Petredox product does lighten the Clarendon oil significantly more, while creating lights and gases plus gasoline fractions at the expense of the heavier fractions. However, the amount of gas generation is lower.
5. All of the commercial products tested caused the oils to thicken. If a commercial product is to be used for gas generation, it must be carefully chosen for the oil it is to modify.

EXAMPLE XIII—CONTROL OF THE CHEMICAL BY VARYING THE REACTION ENVIRONMENT

Background

It is possible to effect different modifications of hydrocarbons by modifying the process for making the modification chemical. Specifically, by changing the atmosphere in which the alkali and silicon are reacted, the end product of the reaction and the nature of the modification of hydrocarbon are changed. I have obtained data for cases where the oxygen available to the reaction was limited by reacting the alkali and silicon in a closed vessel. The product of the "closed" or reaction in an environment of limited oxygen has significantly different physical properties from the properties of the product of a reaction in an air or oxygen environment. The corresponding modification that these products produce on hydrocarbons such as crude oils is also different.

I also have conducted reactions in a nitrogen environment and in an environment that is changed during the course of the reaction. In the latter case I have initiated the reaction in a closed reactor. After a time, which is variable, I have then opened the reactor to air. Similarly, I have conducted the initial portion of the reaction in an air atmosphere and then closed the reaction to air. The results of these different reaction conditions influence the nature or degree of modification of the hydrocarbon that is achieved from the product.

Some data comprising the different effects of the product of an open reactor and a closed reactor are given below, where data is presented for several different crude oils. The observed variables are the gas produced from reaction with the crude oil and the specific gravity of the hydrocarbon after reaction, expressed in API degrees.

| Oil (Source) | Ratio (Silicon: Alkali) | Molarity M | Gas (cc) Open | Gas (cc) Closed | Density (API°) Open | Density (API°) Closed |
|---|---|---|---|---|---|---|
| Clay County | 1:9 | 1.5 | 7.4 | 0.8 | | |
| Clay County | 1:9 | 3.0 | 14.3 | 10.0 | | |

-continued

| Oil (Source) | Ratio (Silicon: Alkali) | Molarity M | Gas (cc) Open | Gas (cc) Closed | Density (API°) Open | Density (API°) Closed |
|---|---|---|---|---|---|---|
| Clay County | 1:9 | 3.5 | 13.3 | 2.8 | | |
| Clay County | 1:9 | 4.5 | 8.8 | 3.8 | | |
| Clay County | 1:9 | 5.0 | 4.7 | 0 | | |
| Sprayberry | 1.9* | 1.5 | 12.4 | 6.0 | 38.12 | 38.27 |
| Sprayberry | 1.1.4* | 8.0 | 12.0 | 6.2 | 38.47 | 38.06 |
| Heiser | 1.9* | 1.5 | 14.3 | 0 | 34.00 | 33.40 |
| Heiser | 1:1.4* | 8.0 | 14.3 | 14.3 | 33.71 | 34.09 |

*The chemicals contain an additional component, Pd.

My data on changing the environment during the reaction shows that the physical characteristics of the chemical product change depending upon the reaction conditions.

| Ratio | Molarity | Reaction Initial | Environment Second | State of Product |
|---|---|---|---|---|
| 1:1.4 | 1.5 | Closed | Open | Solid |
| 1:1.4 | 1.5 | Closed | Closed | Liquid |
| 1:1.4 | 1.5 | Closed | Open* | Liquid |
| 1:1.4 | 1.5 | Open | Closed | Solid |

*Water was added during the second stage of reaction.

The initial reaction was allowed to progress for approximately 1 hour. Then the second environment was imposed.

It is understood that various other modifications will be apparent to and can readily be made by those skilled in the art without departing from the scope and spirit of this invention. Accordingly, it is not intended that the scope of the claims appended hereto be limited to the description set forth above, or the foregoing examples, but rather that the claims be construed as encompassing all the features of patentable novelty which reside in the present invention, including all features which would be treated as equivalents thereof by those skilled in the art to which the invention pertains.

I claim:

1. A composition having the capability of modifying hydrocarbons, said composition including a basic aqueous solution having a pH greater than about 9 said solution being formed of alkali metal silicate and finely divided silicon particles suspended in said solution.

2. The composition according to claim 1 wherein the alkali metal is at least one member selected from the group consisting of sodium, potassium and lithium.

3. The composition according to claim 2 wherein there is more than one alkali metal silicate specie, the species being monomeric and polymeric and having the formula Alkali Metal$_x$ (SiO$_3$)$_x$ wherein each "x" is between about 1 and 8 and the "x's" may or may not be equal.

4. The composition according to claim 1 wherein the alkali metal silicate is formed in a solution by the reaction of the alkali metal hydroxide and silicon.

5. The composition according to claim 4 further including a hydrogenation catalyst selected from the group of metals consisting of iron, cobalt, nickel, copper, zinc, tin, aluminum, molybednium, tungsten, titanium, vanadium, chromium, manganese, paladium and platinum in quantities between about $1 \times 10^{-6}$ and 1.0 moles per mole of silicon.

6. The composition according to claim 4 further including a hydrogenation catalyst selected from the group of soluble ions consisting of iron, cobalt, nickel, copper, zinc, tin, aluminum, molybdenium, tungsten, titanium, vanadium, chromium, and manganese.

7. The composition according to claim 4 further including a dispersing agent selected from the group consisting of alkali metal silicates, alkali metal sulfates, alkali metal carbonates, alkali metal tetraborates, trialkali metal phosphates and alkali metal hexametaphosphates, said dispersing agent being added in quantities between about 0.001 and 10.0 moles per mole of silicon.

8. The composition of matter according to claim 4 wherein the alkali metal hydroxide is a member selected from the group consisting of sodium, potassium and lithium hydroxide.

9. The composition according to claim 8 further including at least one member selected from the group consisting of soluble ions derived from iron, cobalt, nickel, copper, zinc, tin, aluminum, molybdenum, tungsten, titanium, vanadium, chromium, mangenese, as a hydrogenation catalyst for the oil, said member being present in quantities between about $1 \times 10^{-6}$ and 1.0 moles per mole of silicon.

10. The composition according to claim 8 further including at least one member selected from the group consisting of iron, cobalt, nickel, copper, zinc, tin, aluminum, molybdenum, tungsten, titanium, vanadium, chromium, manganese, as a hydrogenation catalyst for the oil, said member being present in quantities between about $1 \times 10^{-6}$ and 1.0 moles per mole of silicon.

11. The composition according to claim 8 wherein at least 50% by weight of the solvent is water.

12. The composition according to claim 8 wherein the balance of the solvent is methyl, ethyl or isopropyl alcohol.

13. The composition according to claim 8 wherein between about 0.025 to 10 molar aqueous solution of said alkali metal hydroxide is mixed per mole of silicon.

14. The composition according to claim 7 further including a dispersing agent selected from the group consisting of alkali metal silicates, alkali metal sulfates, alkali metal carbonates, alkali metal tetraborates, trialkali metal phosphates and alkali metal hexametaphosphates, said dispersing agent being added in quantities between about 0.001 and 10.0 moles per mole of silicon.

15. A process for enhancing the recovery of oil from an oil well the steps which comprise:
    forming a mixture of an alkali metal hydroxide and silicon at a pH greater than 9 to produce an alkali metal silicate having penetrating and dispersing properties, said mixture further containing particles of said silicon suspended therein; and
    injecting said mixture into an oil well and recovering oil from said well.

16. The process according to claim 15 wherein the alkali metal hydroxide is a member selected from the group consisting of sodium, potassium and lithium hydroxide.

17. The process according to claim 16 further including at least one member selected from the group consisting of soluble ions and/or anions of iron, cobalt, nickel, copper, molybdenum, tungsten, titanium, vanadium, chromium, mangenese, paladium and platinum as a hydrogenation catalyst for the oil, said member being present in quantities between about $1 \times 10^{-6}$ and 1.0 moles per mole of silicon.

18. The process according to claim 15 further including at least one member selected from the group consisting of elemental iron, cobalt, nickel, copper, zinc, tin, aluminum, molybdenum, tungsten, titanium, vanadium, chromium, manganese, as a hydrogenation catalyst for the oil, said member being present in quantities between about $1 \times 10^{-6}$ and 1.0 moles per mole of silicon.

19. The process according to claim 16 wherein at least 50% by weight of the solvent is water.

20. The process according to claim 16 further including a dispersing agent selected from the group consisting of alkali metal silicates, alkali metal sulfates, alkali metal carbonates, alkali metal tetraborates, tri-alkali metal phosphates and alkali metal hexametaphosphates, said dispersing agents being added in quantities between about 0.001 and 10.0 moles per mole of silicon.

21. A process for modifying oil the steps which comprise:
forming a mixture of an alkali metal hydroxide and silicon, said silicon being suspended in said mixture in a finely divided state, said mixture having a pH greater than about 9; and
mixing said mixture with oil so as to modify the components of the oil.

22. The process according to claim 21 wherein the alkali metal hydroxide is a member selected from the group consisting of sodium, potassium and lithium hydroxide.

23. The process according to claim 22 further including at least one member selected from the group consisting of soluble ions and/or anions of iron, cobalt, nickel, copper, molybdenum, tungsten, titanium, vanadium, chromium, manganese, paladium and platinum as a hydrogenation catalyst for the oil, said member being present in quantities between about $1 \times 10^{-6}$ and 1.0 moles per mole of silicon.

24. The process according to claim 21 further including at least one member selected from the group consisting of elemental iron, cobalt, nickel, copper, zinc, tin, aluminum, molybdenum, tungsten, titanium, vanadium, chromium, manganese, as a hydrogenation catalyst for the oil, said member being present in quantities between about $1 \times 10^{-6}$ and 1.0 moles per mole of silicon.

25. The process according to claim 22 wherein at least 50% by weight of the solvent is water.

26. The process according to claim 22 further including a dispersing agent selected from the group consisting of alkali metal silicates, alkali metal sulfates, alkali metal carbonates, alkali metal tetraborates, tri-alkali metal phosphates and alkali metal hexametaphosphates, said dispersing agent being added in quantities between about 0.001 and 10.0 moles per mole of silicon.

27. A composition having the capability of modifying hydrocarbons, said composition including an aqueous solution of alkali metal silicate and suspended silicon particles, said solution having a pH greater than 9.

28. The composition of claim 27 wherein said alkali metal silicate is an orthosilicate.

29. The composition of claim 27 wherein said alkali metal silicate is a metasilicate.

30. A process for modifying oil, including contacting oil with a composition including an aqueous solution of alkali metal silicate and suspended silicon particles, said solution having a pH greater than 9.

31. The process of claim 30 wherein said alkali metal silicate is an orthosilicate.

32. The process of claim 30 wherein said alkali metal silicate is a metasilicate.

33. A process for preparing a composition having the capability of modifying hydrocarbons, including forming an aqueous solution of alkali metal silicate and suspended silicon particles, said solution having a pH greater than 9.

34. The process of claim 33, including forming said solution in a closed vessel.

35. The process of claim 33, including forming said solution in an open vessel.

* * * * *